United States Patent Office 3,292,697
Patented Dec. 20, 1966

3,292,697
STABLE POSITIVE NONSIMPLE LIQUID FOR WATER-FLOODING SUBTERRANEAN FORMATIONS
Milton K. Abdo, Dallas, Tex., and Paul E. Blatz, Laramie, Wyo., assignors to Mobil Oil Corporation, a corporation of New York
No Drawing. Filed June 19, 1964, Ser. No. 376,588
9 Claims. (Cl. 166—9)

This invention relates to positive nonsimple liquids. More particularly, this invention relates to the treatment of a positive nonsimple liquid for use in a permeable earth formation. Still more particularly, this invention is directed to the treatment of a flooding liquid for recovering oil from a subterranean formation.

The oil accumulated in subterranean formations is recovered or produced therefrom through wells drilled into the subterranean formations. A large amount of the oil is left in a subterranean formation if the formation is produced only by primary depletion, i.e., by employing only the initial formation energy to recover the oil. Supplemental operations, often referred to as secondary recovery operations, are used to improve the recovery of oil from subterranean formations. In certain of these supplemental recovery operations, a fluid is injected through at least one well, called an injection well, and passed into the formation. The oil is moved through the formation and is produced from another well, called a production well, or wells, as the injected fluid passes from the injection well toward the production wells.

One of the most widely used secondary recovery operations is waterflooding. In these operations, water is the fluid passed into the formation. The methods of waterflooding disclosed in the prior art have included the addition of thickeners to the water. Further, surfactants have been taught as additives to the water to increase the recovery of oil from the subterranean formations over that recovered by water alone.

Recently, a group of liquids known as positive nonsimple liquids have been demonstrated to be effective for the treatment of subterranean formations. Such treatments have included fracturing and solvent treatment to dissolve solid material of the formation to increase the permeability of the formation. These liquids have also been demonstrated to be effective as flooding liquids to recover oil from a subterranean formation.

As used herein, a positive nonsimple liquid is a liquid whose apparent viscosity is higher when it flows in more permeable strata than when it flows in parallel, i.e., under the influence of the same differential pressure drop, in less permeable strata. The positive nonsimple liquid thus is active in the sense that it adjusts its properties to flow at a rate which is relatively insensitive to the permeability of the medium in which it is flowing. As a result, differences in rates of flow of the liquid in the portions of the formation having different permeabilities are minimized. The flow profile thus becomes more nearly uniform, and, as a result, more nearly uniform treatment of the formation is obtained.

Positive nonsimple liquids which have been demonstrated to be effective for the treatment of subterranean formations comprise aqueous solutions incorporating from 0.1 to 0.45 percent by weight of ammonium oleate and containing ammonium hydroxide. However, the ammonium oleate positive nonsimple liquids lose their activity with age. With loss of activity, the aqueous ammonium oleate positive nonsimple liquids are no longer effective for their intended purposes.

Therefore, it is an object of this invention to provide a method of alleviating the loss of activity of an aqueous ammonium oleate positive nonsimple liquid.

It is another object of the invention to provide a method of extending the duration of activity of a positive nonsimple aqueous ammonium oleate solution for treating a subterranean formation.

It is another object of the invention to provide a method of extending the duration of activity of such aqueous ammonium oleate solutions for recovering oil from an oil-containing subterranean formation.

It is a particular object of the invention to provide a method whereby a positive nonsimple aqueous ammonium oleate solution will retain its efficacy and remain active in a subterranean formation for prolonged periods of time.

In accordance with the invention, the loss of activity of a positive nonsimple aqueous ammonium oleate solution is alleviated by incorporating into the solution an ammonium halide. As a result thereof, the aqueous ammonium oleate solution is stabilized. It will thus remain a positive nonsimple liquid for an indefinite period of time. As the ammonium halide, it is preferred to employ ammonium chloride. However, other halides of ammonia, e.g., ammonium bromide and ammonium iodide, will operate in the same manner as ammonium chloride.

As mentioned hereinabove, the positive nonsimple aqueous ammonium oleate solutions contain ammonium hydroxide. This ammonium hydroxide is necessary to impart activity to the solution. The ammonium hydroxide is ordinarily provided by employing ammonium hydroxide per se, or by adding ammonia, as a component of the solution. However, where, in accordance with the invention ammonium halide is incorporated into the solution, the ammonium halide provides a substitute for the ammonium hydroxide. Thus the amount of ammonium hydroxide per se or ammonia required to obtain activity can be eliminated or reduced.

In order that the aqueous ammonium oleate solution be active, it must have a pH of between about 9.5 and about 12. Preferably it should have a pH between 10 and 11. The required pH is ordinarily provided by ammonium hydroxide in the solution. If desired, however, a caustic, such as sodium carbonate or sodium hydroxide, may be used to bring the pH into the desired range. Use of caustic to obtain the desired pH reduces the amount of ammonium hydroxide which is required. Ammonium halide in aqueous solution hydrolyzes and forms in the solution a strong acid and a weak base. Thus, the addition of the ammonium halide to the aqueous ammonium oleate solution results in lowering the pH of the solution. Hence, with the incorporation of the ammonium halide into the ammonium oleate solution, ammonium hydroxide or caustic in addition to that otherwise required is employed to maintain the pH of the solution in the desired range.

To prevent the loss of activity of the positive nonsimple aqueous ammonium oleate solution, at least 0.05 percent by weight of ammonium halide must be incorporated into the solution. Greater amounts may be incorporated if desired. For example, an amount as high as 1 percent by weight or greater may be employed. However, it is desirable to employ the least amount which will obtain the desired retention of activity. The minimum amount of ammonium halide to be employed depends on whether caustic is employed to adjust the pH values. Where caustic is employed, the amount of ammonium halide should be at least equivalent to the amount of caustic. By equivalent is meant the same number of mols. Preferably, the number of mols of ammonium halide incorporated into the solution will be from 3 to 12 percent greater than the number of mols of caustic employed. As a specific example, an active aqueous ammonium oleate solution containing 0.136 percent by weight ammonium oleate and 0.216 percent by weight sodium hydroxide required 0.30 percent by weight of ammonium chloride to achieve a desired stability. The resulting solution had extreme activity and retained its activity over a prolonged period, e.g., longer than six months.

A comparison of the relative activity of various positive nonsimple liquids comprising aqueous ammonuim oleate solutions is afforded by measuring and plotting their viscosities at various rates of shear. The measuring of the viscosities versus shear rates is performed on a rotational viscometer, such as a Couette-type viscometer. The relative activity of the liquid is indicated by the area between the viscosity curve, i.e., the curve of the viscosity versus the shear rate, plotted for the solvent and the respective viscosity curve plotted for each liquid when tested under identical experimental conditions. For comparisons herein, an approximately logarithmic progression is used. For example, a positive nonsimple liquid of activity denoted by the adjective "high" might show a viscosity response to varying shear rates such that its curve when plotted had thereunder an area of approximately $y$ with a particular viscometer configuration. In comparison, liquids having activities denoted by the adjectives "slight," "moderate," and "extreme" would develop respective areas of $0.01y$, $0.1y$, and $10y$ with an identical viscometer configuration.

Table I below illustrates some typical positive nonsimple aqueous solutions of ammonium oleate, abbreviated $NH_4Ol$, which show the decrease in activity with age and illustrate the preservative effect of adding ammonium chloride thereto.

| $NH_4Ol$, Wt. percent | $NH_3$, Wt. percent | NaCl, Wt. percent | $NH_4Cl$, Wt. percent | pH | Decrease in Activity |
|---|---|---|---|---|---|
| 0.104 | 0.237 | | | 10.5 | From high to only slight in 1 day. |
| 0.104 | 0.275 | | | 10.5 | Do. |
| 0.455 | 0.46 | | | | From extreme to only moderate in 32 days. |
| 0.15 | 1.28 | | | | From extreme to slight in 2 weeks. |
| 0.104 | 0.237 | 1.33 | | 10.5 | From high to only slight in 3 days. |
| 0.10 | 0.14 | | 0.02 | 10 | From very high to only slight in 1 day. |
| 0.15 | 0.52 | | 0.05 | | Remained extreme even after 94 days. |
| 0.104 | 0.862 | | 0.204 | 10.5 | Remained extreme even after 150 days. |

The invention is particularly useful in connection with a method for recovery of oil from a subterranean formation by injecting a positive nonsimple aqueous ammonium oleate solution through an injection well and into the formation, and producing oil from the formation through a production well. In this embodiment, there is incorporated into at least a portion of the ammonium oleate solution an ammonium halide in an amount sufficient to preserve the activity of the positive nonsimple aqueous ammonium oleate solution.

It has been proposed to use one or more slugs of a positive nonsimple aqueous ammonium oleate solution in recovering oil from a subterranean formation. Such slugs are of from 0.1 to 30 percent, preferably 1 to 10 percent, of the pore volume of the formation. The ammonium chloride is added to each slug to prevent loss of activity of the slug as it passes in the subterranean formation from the injection well toward the production well.

The slugs of stabilized positive nonsimple aqueous ammonium oleate solution are useful, not only in immiscible flooding operations where the flooding liquid is water, but are useful also in conjunction with other secondary recovery processes such as gas cycling at either high or low pressure, enriched gas drives, or miscible flooding. In such combination processes employing water, gas, or miscible fluid, one or more slugs of the positive nonsimple liquid is injected before or alternately with the other fluid. Suitable examples of such other fluids include gaseous or liquid hydrocarbons, air, carbon dioxide, or ammonia.

Divalent ions have a tendency to react with ammonium oleate and precipitate the divalent oleate. Accordingly, where the aqueous ammonium oleate positive nonsimple liquid is employed for the treatment of a subterranean formation, it is preferable to inject water into the subterranean formation ahead of the stabilized positive nonsimple aqueous ammonium oleate solution. The injected water miscibly displaces within the formation any solutions containing divalent metal ions and prevents contact of these solutions with the ammonium oleate solution.

As an additional safeguard, where divalent ions are to be encountered, a chelating or sequestering agent such as the tetrasodium salt of ethylenediaminetetraacetic acid, sold commercially as sodium Versenate; or sodium phosphate glass, commonly called sodium hexametaphosphate and sold commercially as Calgon, can be added to the aqueous ammonium oleate positive nonsimple liquid. These agents can be employed in an amount from 0.1 to 1.5 percent by weight of the liquid. In these amounts, the agents will satisfactorily chelate divalent ions, particularly calcium. Greater amount of the chelating agent may be used where the solution is free of sodium chloride. However, more than 1.5 percent by weight of the chelating agent should be avoided where relatively high percentages, e.g., 3.5 to 5 percent by weight, of sodium chloride are present since, as has been found, the combination of the high percentage of the sodium chloride and of the agent destroys the activity of the positive nonsimple liquid. Alternatively, the chelating agent may be added to water injected into the formation ahead of the positive nonsimple liquid; or a solution of the chelating agent may be injected into the formation behind the water.

Having thus described our invention, it will be understood that such description has been given by way of illustration and example and not by way of limitation, reference for the latter purpose being had to the appended claims.

What is claimed is:

1. A method of alleviating the loss of activity of a positive nonsimple aqueous ammonium oleate solution which comprises incorporating therein an ammonium halide in an amount of at least 0.05 percent by weight and sufficient to preserve the activity of said positive nonsimple aqueous ammonium oleate solution.

2. The method of claim 1 wherein said aqueous ammonium oleate solution contains caustic and the number of mols of said ammonium halide incorporated is at least equal to the number of mols of said caustic present.

3. The method of claim 2 wherein the number of mols of said ammonium halide incorporated is at least 3 to 12 percent greater than the number of mols of said caustic present.

4. In a method for recovery of oil from a subterranean formation by injecting a positive nonsimple aqueous ammonium oleate solution through an injection well and into said formation, and producing oil from said formation through a production well, the improvement which comprises incorporating into at least a portion of said ammonium oleate solution an ammonium halide in an amount sufficient to preserve the activity of said positive nonsimple aqueous ammonium oleate solution.

5. In a method of recovering oil from a subterranean formation by injecting at least one fluid and a positive nonsimple aqueous ammonium oleate solution through an injection well into said formation, and producing oil from said formation through a production well, the improvement comprising incorporating into said aqueous ammonium oleate solution an ammonium halide in an amount sufficient to preserve the activity of said positive nonsimple aqueous ammonium oleate solution.

6. In a method of recovering oil from a subterranean formation by injecting water and a positive nonsimple aqueous ammonium oleate solution through an injection well into said formation, and producing oil from said formation through a production well, the improvement comprising incorporating into said aqueous ammonium oleate solution an ammonium halide in an amount sufficient to preserve the activity of said positive nonsimple aqueous ammonium oleate solution.

7. The method of claim 6 wherein said positive nonsimple aqueous ammonium oleate solution contains caustic and the number of mols of said ammonium halide incorporated is at least equal to the number of mols of caustic present.

8. The method of claim 7 wherein said caustic is sodium hydroxide and is in an amount of at least 0.216 percent by weight and wherein said ammonium halide is ammonium chloride and is in an amount of at least 0.30 percent by weight.

9. A method of recovering oil from an oil-containing subterranean formation having an injection means comprising at least one injection well and a production means comprising at least one production well completed therein, comprising the steps of:
  (a) injecting through said injection means, water in an amount from 0.01 to 1 percent pore volume,
  (b) injecting through said injection means 0.01 to 1 percent pore volume of an aqueous solution containing from 0.1 to 1.5 percent by weight of a chelating agent selected from the class consisting of tetrasodium ethylenediaminetetraacetic acid and sodium hexametaphosphate,
  (c) injecting through said injection well a positive nonsimple liquid comprising water, 0.1 to 0.45 percent by weight ammonium oleate, sufficient caustic to provide a pH of between 9.5 and 12, and an ammonium halide in an amount of at least 0.05 percent by weight, and preferably in a number of mols at least 3 to 12 percent greater than the number of mols of said caustic,
  (d) injecting through said injection well, water to drive the foregoing liquids toward said production means, and
  (e) simultaneously producing said producing means to recover the oil displaced from within said formation.

References Cited by the Examiner

UNITED STATES PATENTS

| | | | |
|---|---|---|---|
| 2,341,500 | 2/1944 | Detling | 252—8.55 |
| 2,596,845 | 5/1952 | Clark | 166—42.1 X |
| 2,869,643 | 1/1959 | Schlusser | 166—42.1 |
| 3,087,539 | 4/1963 | Maurer | 166—9 |

CHARLES E. O'CONNELL, *Primary Examiner.*

S. J. NOVOSAD, *Assistant Examiner.*